(12) United States Patent
Salloum

(10) Patent No.: US 10,748,105 B2
(45) Date of Patent: Aug. 18, 2020

(54) COMPUTERIZED SYSTEM FOR TRANSPORTING CARGO

(71) Applicant: Houssam Salloum, Dearborn, MI (US)

(72) Inventor: Houssam Salloum, Dearborn, MI (US)

( * ) Notice: Subject to any disclaimer, the term of this patent is extended or adjusted under 35 U.S.C. 154(b) by 0 days.

(21) Appl. No.: 16/416,799

(22) Filed: May 20, 2019

(65) Prior Publication Data
US 2019/0272493 A1 Sep. 5, 2019

Related U.S. Application Data

(63) Continuation of application No. 10/032,213, filed on Dec. 21, 2001, now Pat. No. 10,296,864, which is a continuation of application No. PCT/US00/18076, filed on Jun. 30, 2000.

(60) Provisional application No. 60/141,947, filed on Jul. 1, 1999.

(51) Int. Cl.
*G06Q 10/08* (2012.01)
*G06Q 10/02* (2012.01)

(52) U.S. Cl.
CPC .......... *G06Q 10/08* (2013.01); *G06Q 10/025* (2013.01)

(58) Field of Classification Search
USPC ................ 705/7.11–7.42, 2–4, 13, 330–337
See application file for complete search history.

(56) References Cited

U.S. PATENT DOCUMENTS

| 6,035,289 | A | * | 3/2000 | Chou | G06Q 30/08 |
| | | | | | 705/35 |
| 6,920,429 | B1 | * | 7/2005 | Barni | G06Q 10/08 |
| | | | | | 705/26.8 |

FOREIGN PATENT DOCUMENTS

| CA | 2294038 A1 | * | 12/1998 | ............. G06Q 10/08 |
| CA | 2294038 A1 | | 12/1998 | |

OTHER PUBLICATIONS

Oreizy, Peyman, "Architecture-Based Runtime Software Evolution", Information and Computer Science, University of California, Irvine, CA, Proceedings of the International Conference of Software Engineering 1998, Kyoto Japan Apr. 19-25, 1998. (Year: 1998).*
U.S. Appl. No. 10/032,213, filed Dec. 21, 2001, Pending.

* cited by examiner

*Primary Examiner* — Amber A Misiaszek
(74) *Attorney, Agent, or Firm* — Dickinson Wright PLLC; Steven C. Hurles

(57) ABSTRACT

A computerized system for selecting a cargo carrier includes a host computer system having access to data of a cargo carrier. The host computer system is accessed by a user via an internet connection. Input means are provided for receiving information from the user into the host computer system concerning cargo to be transported. Output means are provided for sending information to a user of possible cargo transportation options.

4 Claims, 18 Drawing Sheets

What type of cargo are you shipping? (you may select more than one type if applicable):

| Dimensional Cargo | Cars, Vans | Break Bulk | Containers | By selecting more than one cargo type may limit your shipping options. |
| ☐ | ☐ | ☐ | ☐ | |

Click on the Continent to select your Port of Loading (you can click on the arrows to move the globe.)

72 — United States

← →

Select Port of Loading                Select Port of Discharge

Home

What type of cargo are you shipping? (you may select more than one type if applicable):

| Dimensional Cargo | Cars, Vans | Break Bulk | Containers |

☐ ☐ ☐ ☐

By selecting more than one cargo type may limit your shipping options.

Click on the Continent to select your Port of Loading (you can click on the arrows to move the globe.)

Port: Miami
Cities Served:
Jacksonville
Orlando
Tampa
Fort Lauderdale

← 83

82

84 →

POL selected is Miami

Home

Select Port of Discharge
81

Available Itineraries:          112

| line # | vessel | voyage | ETD | ETA |
|---|---|---|---|---|
| 1 | SMITH Lines | 345 | 07/09/99 | 07/18/99 |
| 2 | Jones Lines | 1122 | 07/10/99 | 07/21/99 |
| 3 | Salloum Lines | 554 | 07/08/99 | 07/18/99 |
| 4 | Joe Schmo Lines | 222 | 07/09/99 | 07/19/99 |
| 5 | Square Lines | 6761 | 07/12/99 | 07/28/99 |

| Click here to sort by ETD | Click here to sort by ETA |
|---|---|

To obtain a quote, book your shipment and deliver to your home. All of the above can be done in a few minutes if you click on the 'CONTINUE' button Continue Home

What type of cargo are you shipping? (you may select more than one type if applicable):

| Dimensional Cargo | Cars, Vans, Trucks | Break Bulk | Containers |
| 131 | 132 | 133 | 134 |

Dimensional Cargo  [picture here] —136

Select your units of measurements, unit dimensions and quantity.  —135 commodity  [  ]   driveable ○   towable ○   non-towable ○   metric ○   English ○

Length [ ]  Width [ ]  Height [ ]  Weight [ ]  Quantity [ ]

Special instructions and remarks [  ]

| Edit Record | Add Record | Delete Record |

| selected | item # | commodity | condition | volume | units | quantity |
|---|---|---|---|---|---|---|
| ○ | 1 | Caterpillar | driveable | 200 | cubic feet | 3 |
| ○ | 2 | Sea Ray | towable | 15 | cubic metres | 1 |
| ○ | 3 | Raycon | non-towable | 554 | cubic feet | 2 |
| ○ | 4 | Komatsu | driveable | 222 | cubic metres | 7 |
| ○ | 5 | Caterpillar | driveable | 67 | cubic metres | 1 |

Click here to submit cargo.

Cars Vans Trucks    picture here —146

Select your make, model, and quantity.

— 145

| car ○ | van ○ | big van ○ | truck ○ | Used ○ | New ○ |

Select make ▽   Select model ▽   Quantity [    ]

Special instructions and remarks
[                    ]

| Edit Record | Add Record | Delete Record |
| selected | type | make | model | quanitity |
| ○ | car | Ford | small car | 3 |
| ○ | truck | BMW | luxury car | 1 |
| ○ | van | Opel | small van | 2 |
| ○ | big van | Isuzu | big van | 7 |

Submit

Home

Break Bulk picture here — 156

Select your units of measurements, units dimensions and quantity. — 155

Commodity [____]   metric (meters, metric tons) ○   English (feet, tons) ○

| Length | Width | Height | Weight | Quantity |
|--------|-------|--------|--------|----------|
|        |       |        |        |          |

Special instructions and remarks [____]

| Edit Record | Add Record | Delete Record |
|-------------|------------|---------------|

| selected | commodity | item # | volume | units | quantity |
|----------|-----------|--------|--------|-------|----------|
| ○ |   | 1 | 200 | cubic feet | 3 |
| ○ |   | 2 | 15 | cubic metres | 1 |
| ○ |   | 3 | 554 | cubic feet | 2 |
| ○ |   | 4 | 222 | cubic metres | 7 |

Click here to submit cargo.

Containers picture here —166

Select your container size, type, style and quantity.

― 165

Commodity [____] 20' ○ 40' ○
dry box ○  shipper's own □  high cube ○  open top ○  reefer ○
hazardous □  quantity [____]

Special instructions and remarks
[____]

| Edit Record | Add Record | Delete Record |

| selected | item # | commodity | size | type | style | quantity |
|---|---|---|---|---|---|---|
| ○ | 1 | | 20' | shipper's own | dry box | 3 |
| ○ | 2 | | 20' | | open top | 1 |
| ○ | 3 | | 40' | | reefer | 2 |
| ○ | 4 | | 40' | shipper's own, hazardous | reefer | 7 |
| ○ | 5 | | 20' | | high cube | 7 |

Click here to submit cargo.

Your inquiry # is: [        ] —176

Shipment List: —172

| item # | commodity | make | volume/size | model/type | condition/style | weight | quantity |
|---|---|---|---|---|---|---|---|
| 1 | Caterpillar |  | 200 | cubic feet | driveable | 30 metric tonnes | 3 |
| 2 | paper rolls |  | 15 | cubic metres |  |  | 1 |
| 3 | blue |  | 20' | reefer | shipper's own |  | 2 |
| 4 | car | Ford | car | small car |  |  | 3 |
| 5 | tailer |  | 67 | cubic metres |  | 10 tons | 1 |

| Add Record | Delete Record | |

Available Itineraries: —174

| selected | line # | vessel | voyage | ETD | ETA |
|---|---|---|---|---|---|
| ◉ | 1 | SMITH Lines | 345 | 07/09/99 | 07/18/99 |
| ○ | 2 | Jones Lines | 1122 | 07/10/99 | 07/21/99 |
| ◉ | 3 | Salloum Lines | 554 | 07/08/99 | 07/18/99 |
| ○ | 4 | Joe Schmo Lines | 222 | 07/09/99 | 07/19/99 |
| ○ | 5 | Square Lines | 6761 | 07/12/99 | 07/28/99 |

| Click here to sort by ETD | Click here to sort by ETA | Click here to sort by best price |

Once you have finalized your load and selected your itinerary, press " Book Shipment" to recieve (electronic booking confirmation.) Please remember your Inquiry or print this sheet. Your In days. If you would like to have a different rate or service press "Book Shipment"

Book Shipment

Home

Your EBC number is: [_____]—186
Port of Loading    Port of Discharge    Vessel    Voyage #    ETD Shipment List:

| item # | commodity | make | volume/size | model/type | condition/style | weight | quantity |
|---|---|---|---|---|---|---|---|
| 1 | Caterpillar |  | 200 | cubic feet | driveable | 30 metric tonnes | 3 |
| 2 | paper rolls |  | 15 | cubic metres |  |  | 1 |
| 3 | blue |  | 20' | reefer | shipper's own |  | 2 |
| 4 | car | Ford | car | small car |  |  | 3 |
| 5 | tailer |  | 67 | cubic metres |  | 10 tons | 1 |

Legal Clause:
This is where the lawyers enter the legalese necessary for shipping international cargo.

Please select a method of payment: —182

| COD | pre-paid | collect |
|---|---|---|
| ○ | ○ | ○ |

184 —
Your agent is:
Schmoo Lines, Ltd
Joe Schmoo
1245 Elm Ave.
Anytown, USA
313-555-1212
fax: 313-555-2121
e-mail: joe@schmoolines.com Your local agent will contact you to provide you with service within 24 hours.

[ Click here to contact your local agent. ]

A copy of your EBC will go to:
- POL agent
- the shipping line
- E.Freightforwarding.com You may press the "B/L Instructions" button to fill out the Bill of Lading instructions.

[ B/L Instructions ]

[ Home ]

180 

*Fig-16*

*The standard Bill of Lading appears below with POL, POD, body of cargo as well as the frieght condition. The customer is requested to add the shipper name, consignee, notifying party, or any other changes from the original EBC. If the original EBC is ammended, the rates could be affected.*

The B/L will be sent to the lines from which the EBC was confirmed.

If COD
- The original B/L will be sent to the customer.

If prepaid
- The original B/L will be sent to the customer.

If collect
- Our agent will collect the freight and the original will be sent to our P.O.D. agent The B/L number will be issued by the carrier. However, on the B/L our EBC number will be in the line system allowing us to track the shipment

| Shipper | | | Forwarder | | |
|---|---|---|---|---|---|
| Name: | | | Name: | | |
| Address: | | | Address: | | |
| City: | Prov./State: | | City: | Prov./State: | |
| Country: | P.C./Zip: | | Country: | P.C./Zip: | |
| Tel: | Fax: | | Tel: | Fax: | |
| Email: | | | Email: | | |

| Consignee | | | Notify party | | |
|---|---|---|---|---|---|
| Name: | | | Name: | | |
| Address: | | | Address: | | |
| City: | Prov./State: | | City: | Prov./State: | |
| Country: | P.C./Zip: | | Country: | P.C./Zip: | |
| Tel: | Fax: | | Tel: | Fax: | |
| Email: | | | Email: | | |

Rate Reference Number   Booking Number

Temperature Control Range Required in °Centigrads

Dangerous Goods Consignments Required:
☐ SHIPPER'S DECLARATION
☐ CONTAINER PACKING CERTIFICATE
☐ EMERGENCY RESPONSE INFORMATION Place of Receipt:   Port of Loading:   Port of Discharge:

Vessel:   Place of Delivery:

Fig-17

PARTICULAR FURNISHED BY SHIPPER

| Container & Seal Marks/Numbers | # of Packages | Description of Packages and Goods | Weight in Kilos | CBM |
|---|---|---|---|---|
| | | | | |
| | | | | |
| | | | | |

202

Type of B/Lading:

● Original  ○ Express

Document Release Instruction:

Please Indicate Requirements:

Ocean Frieght  ☐ Prepaid ☐ Collect

Destination Terminal  ☐ Prepaid ☐ Collect

Prepaid Invoice Payable by:

Special Instructions / Remarks:

Call for Pick-Up of Documents:

Name:
Tel:        Fax:

Signature of Shipper

Monday ▽ January ▽ 1 ▽ 1997 ▽

Press to submit your EBC or reset to clear EBC.

| Submit EBC | Reset | tracking

Home

Please enter your EBC number: [    ]  [Submit]  [Clear]

Since we have the voyage # and the name of the vessel, we can show the vessel itinerary:

Port of Loading    Port of Discharge    Vessel    Voyage #    ETD    ETA

| Ports | ETD | ETA |
|---|---|---|
| Miami | June 30 | June 2 |
| New York | July 4 | July 6 |
| Abidjan | July 19 | July 20 |
| Lome | July 20 | July 21 |
| Naples | July 26 | July 27 |

—212

214—

| If your shipment was delivered: |
|---|
| date: |
| June 10 |
| consignee |
| Joe Schmoo |

Your agent is:
Schmoo Lines, Ltd
Joe Schmoo
1245 Elm Ave.
Anytown, USA
313-555-1212
fax: 313-555-2121
e-mail: joe@schmoolines.com Your local agent will contact you to provide you with service within 24 hours.

[Click here to contact your local agent.]

[Home]

COMPUTERIZED SYSTEM FOR TRANSPORTING CARGO

CROSS REFERENCE TO RELATED APPLICATION

This invention is a continuation of U.S. patent application Ser. No. 10/032,213, filed Dec. 21, 2001, which is a continuation of PCT/US00/18076, filed Jun. 30, 2000, which claims the benefit of U.S. Provisional Appln. No. 60/141,947, filed Jul. 1, 1999.

BACKGROUND OF THE INVENTION

This invention relates generally to a system of marine, air and land transportation of cargo, freight, materials, and goods. In particular, this invention is concerned with a computerized system for selecting a cargo transporter and arranging for the transportation of cargo. This system is accessible to users via an Internet web site.

Air and marine cargo carriers provide transportation services from ports of loading to ports of discharge. Land (road and rail) cargo carriers provide transportation services from distribution and other pick-up points to various delivery points. Customers or users can contact a carrier directly or through an agent to determine itineraries and prices. In order to determine which carrier provides the best match of service (type of cargo transported, price, delivery time, etc.), it may be necessary to contact several carriers. Contacting many carriers to determine a match and arrange for the transportation of cargo may be time-consuming and complex.

Historically, agents played a large role in marketing and selling space on a cargo vessel such as a ship, an aircraft, or a truck. The large number of options for global cargo transportation services requires that many factors be considered when selecting a cargo carrier. Furthermore, many market factors can significantly affect prices charged for transportation services.

SUMMARY OF THE INVENTION

This invention includes a computerized system for transporting cargo with marine, air, and land carriers. The computerized system receives inputs from a user such as port of loading, port of discharge, and type of cargo. The system determines and displays carriers that provide service for the desired route and cargo. The system also provides information such as prices and customs requirements and enables a user to book the transportation of cargo. The system also creates a record of the desired service so that a user or an agent can use the information to finalize a transaction at a later time.

In a preferred embodiment, a computerized system for selecting a cargo carrier includes a host computer system having access to data of a cargo carrier. The host computer system is accessed by a user via an internet connection. Input means are provided for receiving information from the user into the host computer system concerning cargo to be transported. Output means are provided for sending information to a user of possible cargo transportation options.

Various objects and advantages of this invention will become apparent to those skilled in the art from the following detailed description of the preferred embodiments, when read in light of the accompanying drawings.

BRIEF DESCRIPTION OF THE DRAWINGS

FIG. 5 is an example display page generated by the host computer system listing sample ports of loading in North America.

FIG. 6 is an example display page generated by the host computer system asking what is the desired port of discharge.

FIG. 9 is an example display page generated by the host computer system showing available itineraries from all carriers providing the requested service between the selected port of loading and the selected port of discharge.

FIG. 11 is an example display page generated by the host computer system asking for dimensional cargo information.

FIG. 12 is an example display page generated by the host computer system asking for cars, vans, and trucks cargo information.

FIG. 13 is an example display page generated by the host computer system asking for break bulk cargo information.

FIG. 14 is an example display page generated by the host computer system asking for containers cargo information.

FIG. 15 is an example display page generated by the host computer system showing available itineraries for the entered cargo.

FIG. 16 is an example display page generated by the host computer system showing payment options for the entered cargo.

FIG. 17 is an example display page generated by the host computer system related to Bill of Lading information.

FIG. 18 is a second example display page generated by the host computer system related to Bill of Lading information.

FIG. 19 is an example display page generated by the host computer system listing a vessel itinerary.

DETAILED DESCRIPTION OF THE PREFERRED EMBODIMENTS

Figure 1:
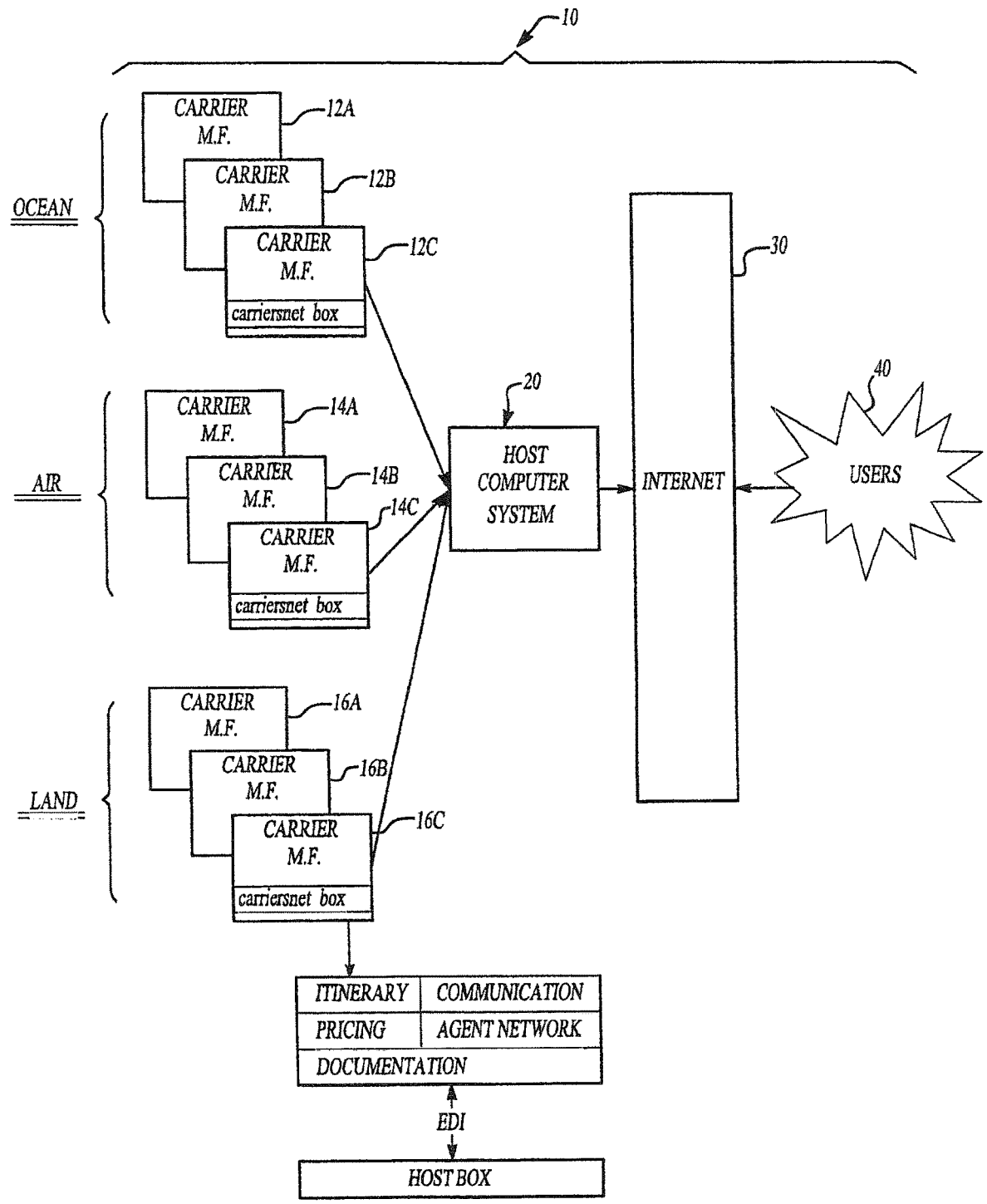
FIG. 1 is a schematic illustration of a computerized system for transporting cargo according to this invention.

A schematic illustration of a computerized system for transporting cargo, freight, materials, and goods according to this invention is indicated generally at 10 in FIG. 1. Individual computer systems 12A, 12B, and 12C of oceanic or marine cargo carriers are preferably connected to a computer system 20 of a host computer system. Individual computer systems 14A, 14B, and 14C of air cargo carriers are preferably connected to the host computer system 20. Individual computer systems 16A, 16B, and 16C of land cargo carriers are preferably connected to the host computer system 20. The individual computer systems 12A-12C, 14A-14C, and 16A-16C contain information such as itineraries for vessels, aircraft, and vehicles, available space, price, etc. This information can be linked to the host computer system 20 by an internet connection. This information can also be transmitted to the host computer system 20 by any desired means, including an internet transfer.

The host computer system 20 is connected to the internet 30. A domain name is provided so that internet users can contact the host computer system 20. An example of a domain name for the host computer system 20 is carrier-snet.com.

Users 40 who wish to transport cargo, freight, materials, or goods can access the host computer system 20 through an on-line connection via the internet 30. Upon contacting the host computer system 20, a series of questions can guide a user to the available options for transporting the cargo. For example, the prompts can start with questions such as "port of loading?" and "port of discharge?" Graphic illustrations can accompany the prompts to assist the user. For example, a graphic illustration may include a map may with various click-on portions so that a user can point-and-click to expedite and ease the task of answering the prompts.

Figure 2:
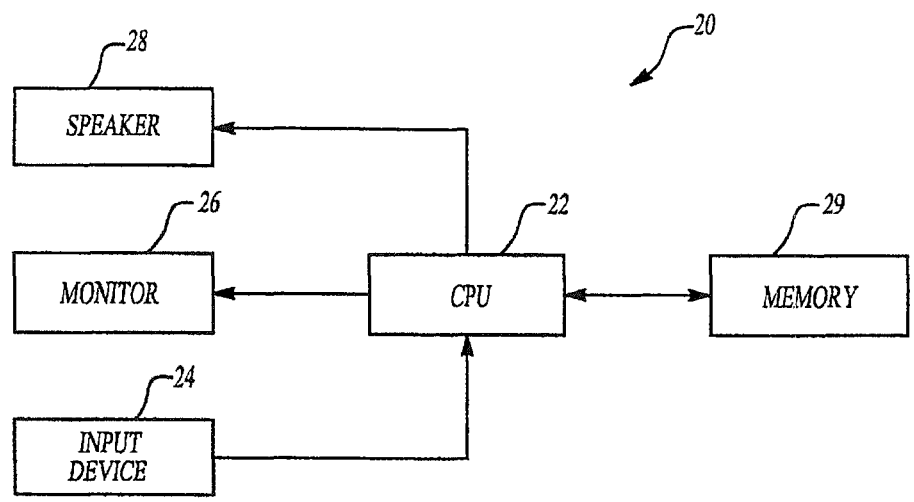
FIG. 2 is a schematic block diagram of a host computer system illustrated as part of the system in FIG. 1.

A schematic block diagram of the host computer system 20 is illustrated in FIG. 2. The host computer system 20 includes a central processing unit (CPU) 22 that includes software. An input device 24, such as a mouse, has an output connected to an input of the CPU 22. A video signal output of the CPU 22 is connected to an input of a monitor 26. The CPU 22 can include a sound card for generating an audio signal at an audio output connected to an input of a speaker 28. An input/output port of the CPU 22 is connected to an input/output port of a memory 29 that can be a hard drive for storing operating system software and an application program for performing steps according to this invention.

A system according to this invention for electronically selecting a cargo carrier and booking transportation of cargo is described below. A user 40 can access the web site of the host computing system 20 via the internet 30. Software contained in the CPU 22 can receive inputs from a user 40 and transmit responses to the user 40.

Figure 3:
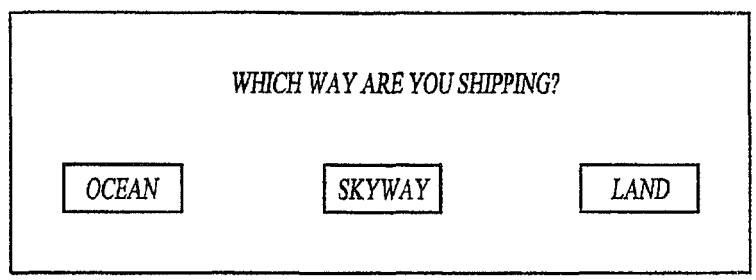
FIG. 3 is a title or start computer screen generated by the host computer system illustrated in FIG. 2.

An example start screen is indicated generally at 50 in FIG. 3. The screen 50 is generated by software of the host computing system 20. The start screen can prompt a user 40 in the use of the system 10. An example of a beginning prompt is to ask a user 40 to select one of three transporting options: oceanway 51, skyway 52, and land 53. A used can point-and-click on a button for one of the options 51, 52, and 53.

Figure 4:
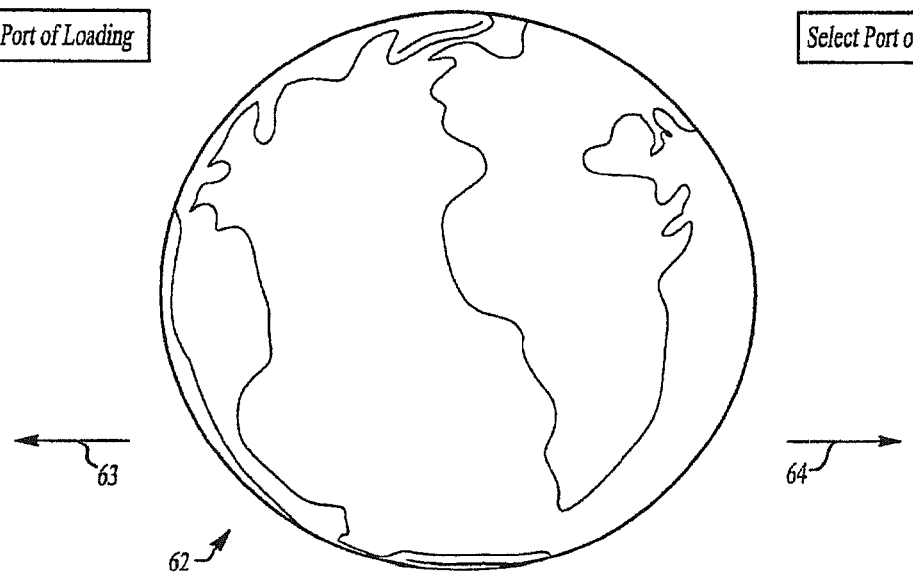
FIG. 4 is an example display page generated by the host computer system asking what type of cargo is to be shipped and what is the desired port of loading.

An example display page is indicated generally at 60 in FIG. 4. The page 60 can prompt a user 40 to select a port of loading option 61. The user 40 can be assisted by a global illustration 62. The global illustration 62 can be rotated by clicking on arrows 63 or 64 to show a desired part of the world.

An example display page is indicated generally at 70 in FIG. 5. A map 72 can assist the user 40. The map 72 can include numerous ports of loading that can be selected by clicking.

An example display page is indicated generally at 80 in FIG. 6. The page 80 can prompt a user 40 to select a port of discharge option 81. The user 40 can be assisted by a global illustration 82. The global illustration 82 can be rotated by clicking on arrows 83 or 84 to show a desired part of the world.

Figure 7:
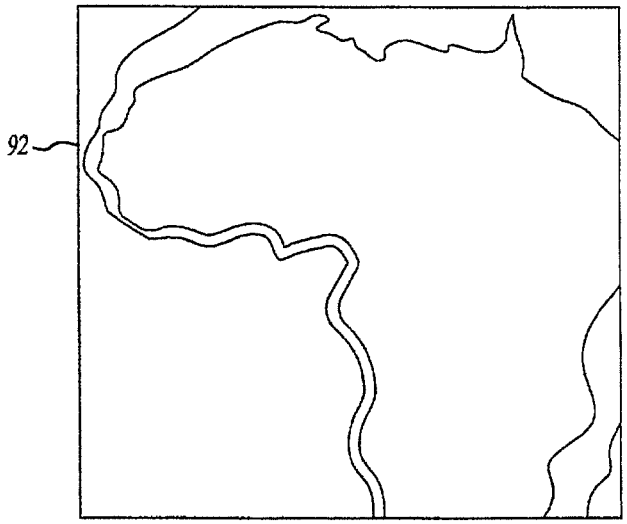
FIG. 7 is an example display page generated by the host computer system listing sample ports of discharge in Africa.

An example display page is indicated generally at 90 in FIG. 7. A map 92 can assist the user 40. The map 92 can include numerous ports of discharge that can be selected by clicking.

Figure 8:
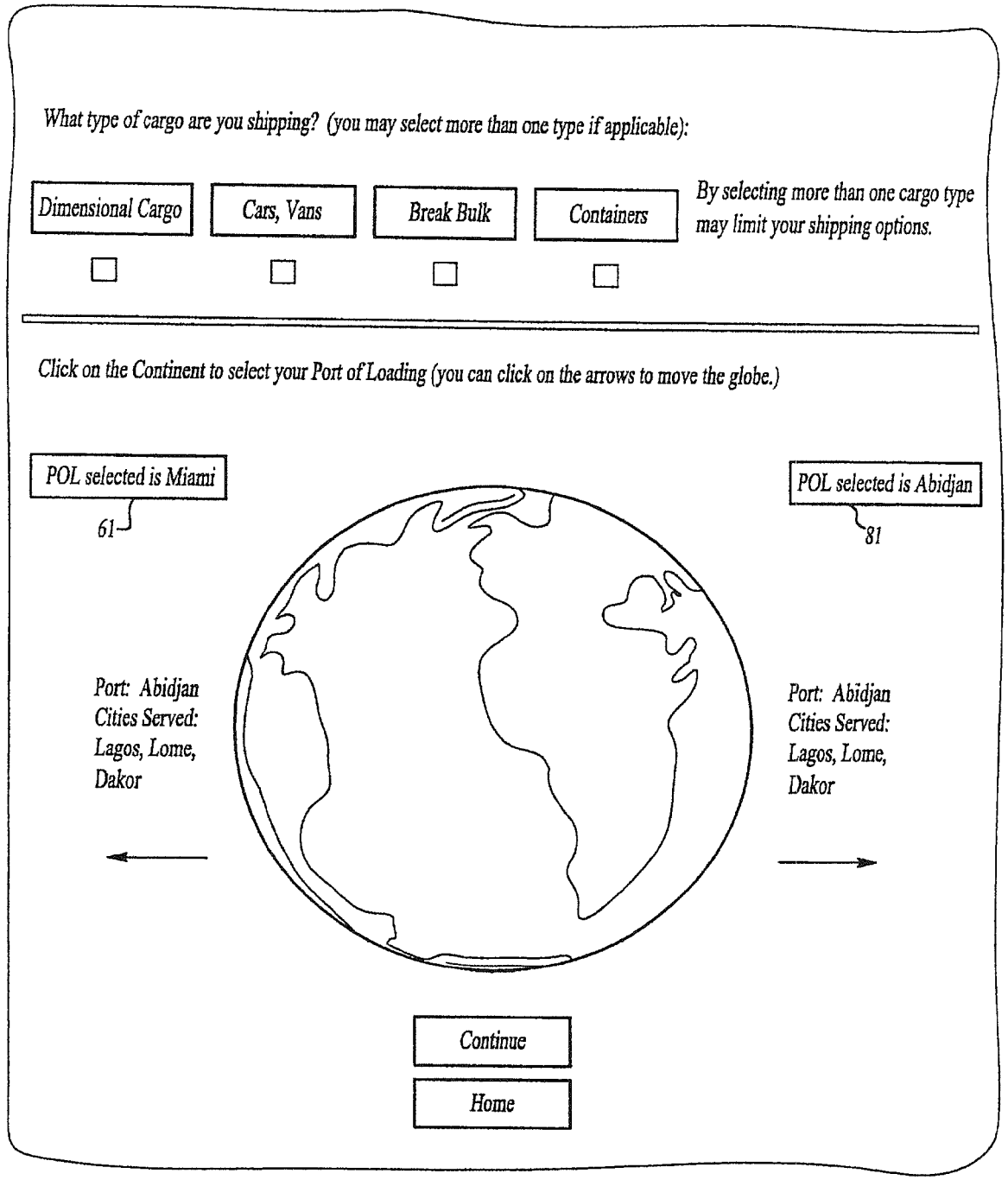
FIG. 8 is an example display page generated by the host computer system indicating a selected port of loading and a selected port of discharge.

After a user has selected a port of loading 61 and a porting of discharge 81, an example display page indicated generally at 100 in FIG. 8 is generated by the host computing system 20. In the example display page 100, Miami has been selected as the port of loading 61 and Abidjan has been selected as the port of discharge 81.

The host computer system 20 will analyze inputs from the user 40 and provide available transportation options. An example display page indicated generally at 110 in FIG. 9 lists available itineraries 112. Example of itinerary information includes vessel, voyage, Estimated Time of Departure, and Estimated Time of Arrival.

The host computer system 20 can also provide a quote, book cargo, and insurance, customs, and bill of lading (B/L) information. The host computer system 20 can also provide the client 40 with information regarding agents based on inputs received from the client 40. Input collected by the host computer system 20 can be forwarded to an agent for use in assisting the client 40.

Figure 10:
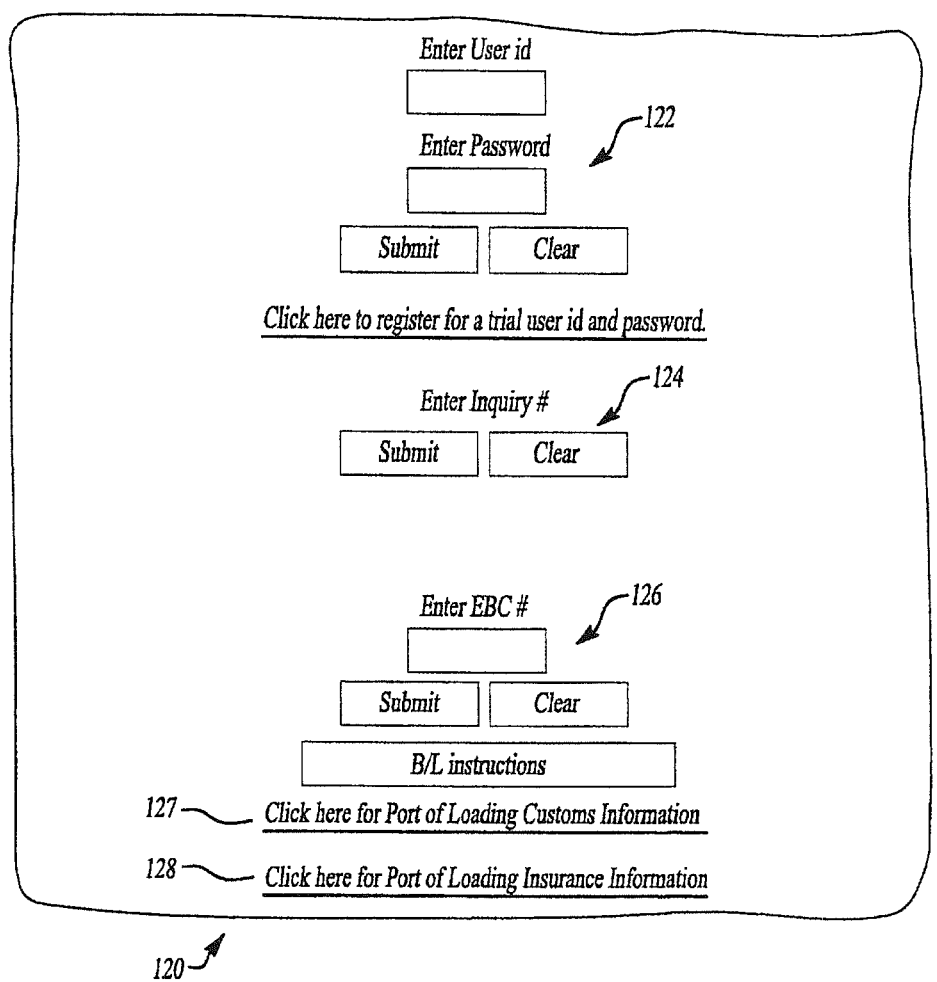
FIG. 10 is an example display page generated by the host computer system showing input windows for user id, password, and others.

The host computer system 20 can be set up with a user id and password system 122 as illustrated in the example display page 120 of FIG. 10. An inquiry number 124 and an electronic booking confirmation 126 can be created by the host computer system 20. A user 40 can enter this information at page 120 to access the host computer system 20. Port of loading customs information 127 and port of loading insurance information 128 can be provided to the user 40.

An example display page is indicated generally at 130 in FIG. 11. The page 130 can prompt a user 40 to what type of cargo is to be shipped. For example, four options can be presented: dimensional cargo 131, cars, vans, trucks 132, break bulk 133, and containers 134. When the dimensional cargo option 131 is selected, the user 40 is prompted to enter measurements and dimensional information in box 135. The user 40 can be assisted with illustrations by clicking on window 136.

When the cars, vans, truck option 132 is selected, an example display page 140 illustrated in FIG. 12 is generated by the host computer system 20. The user 40 is prompted to enter vehicular information in box 145. The user 40 can be assisted with illustrations by clicking on window 146.

When the break bulk option 133 is selected, an example display page 150 illustrated in FIG. 13 is generated by the host computer system 20. The user 40 is prompted to enter vehicular information in box 155. The user 40 can be assisted with illustrations by clicking on window 156.

When the containers option 134 is selected, an example display page 160 illustrated in FIG. 14 is generated by the host computer system 20. The user 40 is prompted to enter vehicular information in box 165. The user 40 can be assisted with illustrations by clicking on window 166.

After the ports of loading and discharge and the type of cargo information have been entered, the host computer system 20 can generate an example display page 170 illustrated in FIG. 15. A shipment list 172 and available itineraries 174 are transmitted to the user 40. An inquiry number 176 can be generated and transmitted. The inquiry number 176 permits the user 40 to return to the host computer system 20 within a specified period and receive updates concerning the shipping options, prices, and the like.

The host computer system 20 can also assist the user 40 with payment options 182 as illustrated in example display page 180 shown in FIG. 16. Other information such as agent information 184 can be transmitted to the user 40. The host computer system 20 can generate an electronic booking confirmation (EBC) 186. The EBC 186 can be used to track a shipment and determine other factors related to a shipment, such as bill of lading instructions.

An example display page is indicated generally at 190 in FIG. 17. Bill of lading information in box 192 can be generated by the host computer system 20 and transmitted to the user 40. Additional information in box 202 of example display page 200 of FIG. 18 can be generated by the host computer system 20.

Additional information such as a vessel itinerary 212 and delivery information 214 of example display page 210 of FIG. 19 can be generated by the host computer system 20.

A user 40 can access the host computer system 20 to select options for the transportation of cargo, freight, materials, and goods. The system 20 is an interactive system that provides flexibility and updates to the user 40. For example, a user 40 can select a certain cargo transportation carrier, a certain vessel, a certain itinerary, first vessel to available, first vessel to arrive at the port of discharge, price, etc. These selections are available in an efficient manner via an internet connection.

In accordance with the provisions of the patent statutes, the principle and mode of operation of this invention has been explained and illustrated in its preferred embodiment. However, it must be understood that this invention may be practiced otherwise than as specifically explained and illustrated without departing from its spirit or scope. For example, various display pages have been presented that permit a user 40 to enter information into the host computer system 20. Various display pages have been presented that can be generated by the host computer system 20. Information related to transporting cargo other that the specific examples listed above are within the scope of this system. Additional or different inputs can be received into the host computer system 20. Additional or different outputs can be generated by the host computer system 20 and transmitted to a user 40.

What is claimed is:

1. A computerized system for arranging transportation for cargo, comprising:
    a plurality of individual computer systems containing data relating to a plurality of cargo transportation options available from a plurality of cargo carriers;
    a host computer system including a central processing unit, a memory, a monitor, and an input device;
    said host computer system being in electrical communication with said plurality of individual computer systems via the internet; and
    said host computer system being configured to:
        display on said monitor a port of loading graphical user interface which includes a port of loading selectable list of port of loading locations,
        receive from said input device a user selection from said port of loading locations on said port of loading selectable list,
        display on said monitor a port of discharge graphical user interface which includes a port of discharge selectable list of port of discharge locations,
        receive from said input device a user selection from said port of discharge locations on said port of discharge selectable list,
        display on said monitor a cargo transportation graphical user interface including a cargo type selectable list comprising at least two of dimensional cargo, vehicles cargo, break bulk cargo, and containers cargo,
        receive from said input device a user selection from cargo type selectable list,
        automatically compare said user selections from said port of loading selectable list, said port of discharge selectable list, and said cargo type selectable list to said data relating to said plurality of cargo transportation options available from said plurality of cargo carriers,
        determine a plurality of matching transportation options and quotes for said matching transportation options,
        display on said monitor a selectable list of said plurality of matching transportation options along with said quotes,
        receive from said input device a user selection of a preferred cargo transportation option from said plurality of matching transportation options.

2. The computerized system as set forth in claim 1 wherein said port of loading graphical user interface includes a manually rotatable global illustration and a port of loading selectable list that is displayed as a function of manual rotation of said global illustration by the user.

3. The computerized system as set forth in claim 2 wherein said port of discharge graphical user interface includes a manually rotatable global illustration and a port of discharge selectable list that is displayed as a function of manual rotation of said global illustration by the user.

4. The computerized system as set forth in claim 1 wherein said data relating to said plurality of cargo transportation options available from said plurality of cargo carriers includes at least one of marine, air, and land cargo options.

* * * * *